(12) United States Patent
Sieradzki

(10) Patent No.: US 6,719,502 B2
(45) Date of Patent: Apr. 13, 2004

(54) BORING RISER HOLES IN A GRAPHITE MOLD

(75) Inventor: Christopher Sieradzki, Monee, IL (US)

(73) Assignee: AMSTED Industries Inc., Chicago, IL (US)

( * ) Notice: Subject to any disclaimer, the term of this patent is extended or adjusted under 35 U.S.C. 154(b) by 39 days.

(21) Appl. No.: 10/122,928

(22) Filed: Apr. 16, 2002

(65) Prior Publication Data

US 2003/0194284 A1 Oct. 16, 2003

(51) Int. Cl.[7] .................... B23B 35/00; B23B 39/12
(52) U.S. Cl. .................... 408/1 R; 408/90; 408/237; 409/221
(58) Field of Search .................... 408/71, 90, 237, 408/1 R, 70, 89; 409/221–223; 74/813 R, 816, 818, 813 L

(56) References Cited

U.S. PATENT DOCUMENTS

| | | | |
|---|---|---|---|
| 1,396,302 A | * 11/1921 | Wagner | 409/221 |
| 1,543,236 A | * 6/1925 | Sears | 82/122 |
| 1,750,746 A | * 3/1930 | Deutsch | 409/227 |
| 1,865,552 A | * 7/1932 | Beulwitz | 74/813 R |
| 1,902,520 A | * 3/1933 | Randles | 408/71 |
| 2,369,425 A | * 2/1945 | Becker | 409/222 |
| 2,874,596 A | * 2/1959 | Witzig | 408/237 |
| 3,380,322 A | * 4/1968 | Brault | 74/813 R |
| 3,891,343 A | * 6/1975 | Davis | 408/71 |

* cited by examiner

Primary Examiner—Daniel W. Howell
(74) Attorney, Agent, or Firm—Edward J. Brosius

(57) ABSTRACT

A drill press is provided that is specially adapted for drilling openings into a cylindrical block. The cylindrical block is placed on an indexing plate that is circular and capable of rotational movement on the drill press table around the center axis of the cylindrical block and indexing plate. An indexing plate support is used to help precisely rotate the indexing plate. The drill press can drill a plurality of openings through the cylindrical block at the same radial distance from the center axis of the block without need to move the drill spindle.

12 Claims, 5 Drawing Sheets

BORING RISER HOLES IN A GRAPHITE MOLD

BACKGROUND OF THE INVENTION

The present invention relates to a method and an apparatus for boring openings in a cylindrical block and, more particularly, a method and apparatus for boring riser holes through a cylindrical graphite block.

The preferred method for manufacturing cast steel railroad wheels is the bottom pressure casting foundry operation wherein molten steel under pressure is forced upwardly into a graphite mold to fill the mold from the bottom upwardly. This bottom pressure casting operation eliminates many of the concerns associated with the traditional top pouring of molten steel in foundry operations such as splashing and insufficient filling of molds. Further, the use of machined graphite molds assures dimensional accuracy. In the casting of railroad wheels, it is usual for the outer side of the wheel, which also corresponds with the top half of the mold or the cope, to include a raised center hub portion and, depending on the size of the wheel, from 6 to 14 raised riser sections extending from the plate portion of the wheel near the rim.

Referring to FIGS. 1–6, the graphite mold itself comprises a top half or cope 10 and a bottom half or drag 12. Both cope 10 and drag 12 are large cylindrical blocks of graphite designed to withstand the 3,000° F. temperature of molten steel used to manufacture the railroad wheel 18. It should be understood that each of the cope 10 and drag 12 are in the neighborhood of from 28 to 52 inches in diameter, corresponding to the size of railroad wheel being manufactured and, upon initial use, about 18 inches in height.

Cope 10 is seen to have the outer section of railroad wheel 18 machined therein, along with risers 16 extending upwardly from the cavity for railroad wheel 18 as well as hub opening 14. Drag section 12 is seen to include an ingate 20 which is adapted to receive a pouring tube and thus the molten metal to be upwardly poured under pressure from the reservoir in the pouring ladle below.

Upon the pressure pouring of the molten steel upwardly through ingate 20, wheel cavity 18 is filled with molten steel which extends upwardly into riser openings 16 and hub opening 14 a predetermined distance. Such additional metal in hub opening 14 and riser openings 16 is necessary such that additional molten metal is available to pour downwardly into the railroad wheel 18 mold during cooling and solidification of the wheel just after pouring.

The various prior art steps in preparing the cope section 10 of the graphite mold will now be described. Referring to FIG. 2, the cope section 10 is seen to comprise a cylindrical block of graphite with dimensions as described above. Such cope 10 is placed in a vertical boring mill wherein boring mill bit 22 is centered to bore hub opening 14 into cope section 10.

Next, template 26 usually made of aluminum of a thickness of about $\frac{3}{8}^{th}$ of an inch as shown in FIG. 3 is placed on top of cope 10. Such template 26 is premachined for a series of riser openings at various radial distances from the center. The inner most diameter riser locator openings at 32; the mid diameter riser locator openings at 30 and the outermost diameter riser locator openings at 28. Such riser openings are premachined in template 26 to correspond with the desired location of risers in the various size copes 10 as required in the manufacture of varying diameter railroad wheels. It is seen that center opening 34 in template 26 is designed to be positioned above hub opening 14 in cope 10.

Referring to FIG. 4, each of riser locator openings 28, 30 and 32 have a raised section 36 extending upwardly such that an associated hand drill bit 40 can be manually centered within the riser locator openings 28, 30 and 32. An initial locating opening 42 is drilled into cope 10 for ultimate location of each riser opening 16. Referring to FIG. 5, such drilled locator openings 42 are shown in cope 10.

As seen in FIGS. 5 and 6, cope 10 is seen positioned on drill press table 47. Trepanning tool 44 includes a projecting locating pin 45 extending from the end thereof. Locating pin 45 is adapted to be placed within riser locating openings 42 in order that risers 16 can be cut at the exact location established by the use of template 26 with the predrilling of locator openings 42.

Another problem with the existing method of drilling riser openings in the graphite block is for the openings farthest from the drill press support, it is difficult to achieve the desired perpendicular alignment of the openings due to loose fit tolerances with the moving parts of the radial drill press. This problem is magnified when the distance the drill press spindle must travel from the support column is greatest.

SUMMARY OF THE INVENTION

Accordingly, it is an object of the present invention to provide an improved method and apparatus for drilling openings in a material block.

It is also an object of the present invention to provide an improved method and apparatus for drilling riser openings in a cylindrical graphite block to be used in the casting of steel railroad wheels.

An improved method and apparatus of drilling riser openings in a graphite block is provided by the present invention. It has been established that from an efficiency and accuracy point of view, it is best to keep the drill press spindle as close to the drill press support along the drill press arm as possible. Accordingly, it was established that since the cope graphite mold has the riser openings at a single radial distance from the center of the cope, it would be possible to rotate the graphite block to the preselected locations and, without the drill press spindle moving, drill the desired riser openings in the graphite block.

An indexing plate is provided that is circular in shape and is mounted to the drill press table in a manner that allows the index plate to rotate about a central axis. The graphite block is placed in the index plate in a manner such that rotation of the index plate is accompanied by rotation of the graphite block. It such be understood that the graphite block is extremely heavy, weighing about 1,000 pounds when at its initial thickness of 18 inches; so that rotation of the supporting index plate is accompanied by rotation of the graphite block placed therein.

An indexing plate support is provided in such that rotation of the indexing plate can be controlled to very accurate increments. Such increments are possible due to predrilling and aligning openings in the indexing support and the indexing plate to allow a pin or pins to position the indexing plate with relation to the indexing plate support. Alternatively, a movement mechanism can be associated with the indexing plate support such as gearing or other motorized control to allow the accurate rotation of the indexing plate through the indexing plate support to preselected locations.

Utilizing such rotation of the indexing plate and the graphite block placed therein, it is possible to locate the drill press spindle at a single location on the drill press arm that is as close as possible to the drill press support for the particular design graphite block and desired location of the riser openings. The indexing plate support is utilized to allow the positioning of the indexing plate and graphite block at the desired location such that the drill head, drill press spindle and drill operate to drill the first riser opening in the graphite block. This is done without the need for the template or initial locator openings mentioned as part of the prior art system.

When the first riser opening is drilled, the indexing plate support is utilized such that the indexing plate is rotated bringing the next desired riser opening location in line with the drill press spindle and drill without moving the drill press spindle or the drill press arm. Further, the drill press spindle remains at the desired location as close as possible to the drill press support. The next riser opening is drilled in the graphite block at the exact same radial distance from the center point of the graphite block. This assures the accurate and perpendicular drilling of the risers and the graphite block since the drill press spindle is at a location as near as possible to the drill press support thereby minimizing its extension outwardly along the drill press arm. Such location of the drill press spindle at the minimum distance from the drill press support along the drill press arm decreases the potential for non-perpendicular drilling of the riser openings.

DETAILED DESCRIPTION

Figure 1:
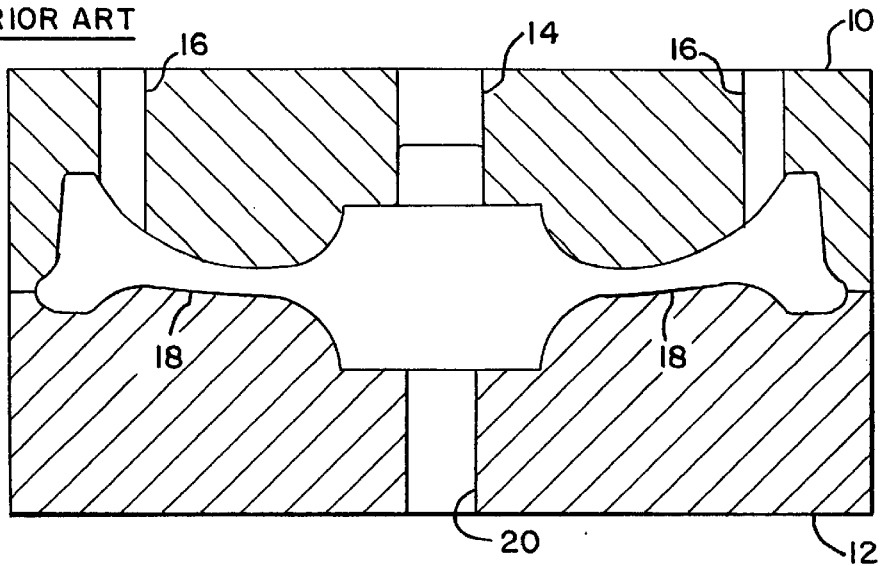
FIG. 1 is a cross section view of a prior art cope and drag graphite mold assembly for the bottom pressure casting of a railroad wheel.
Figure 2:
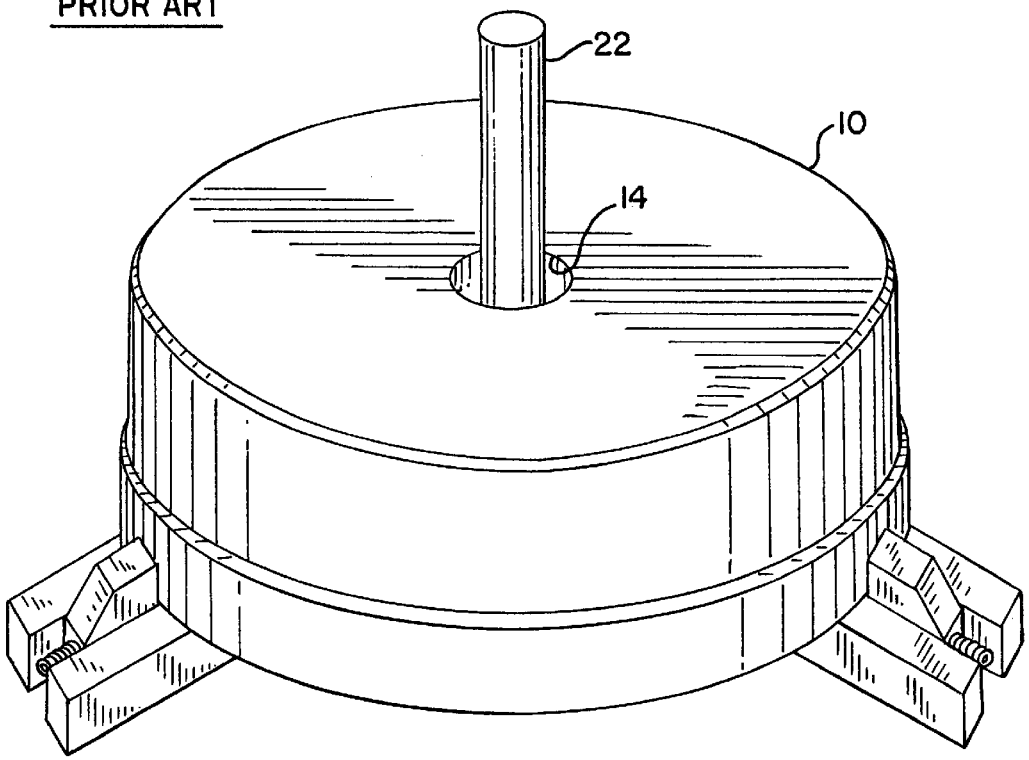
FIG. 2 is a perspective view of a prior art cope section of a graphite mold showing a central bore.
Figure 3:
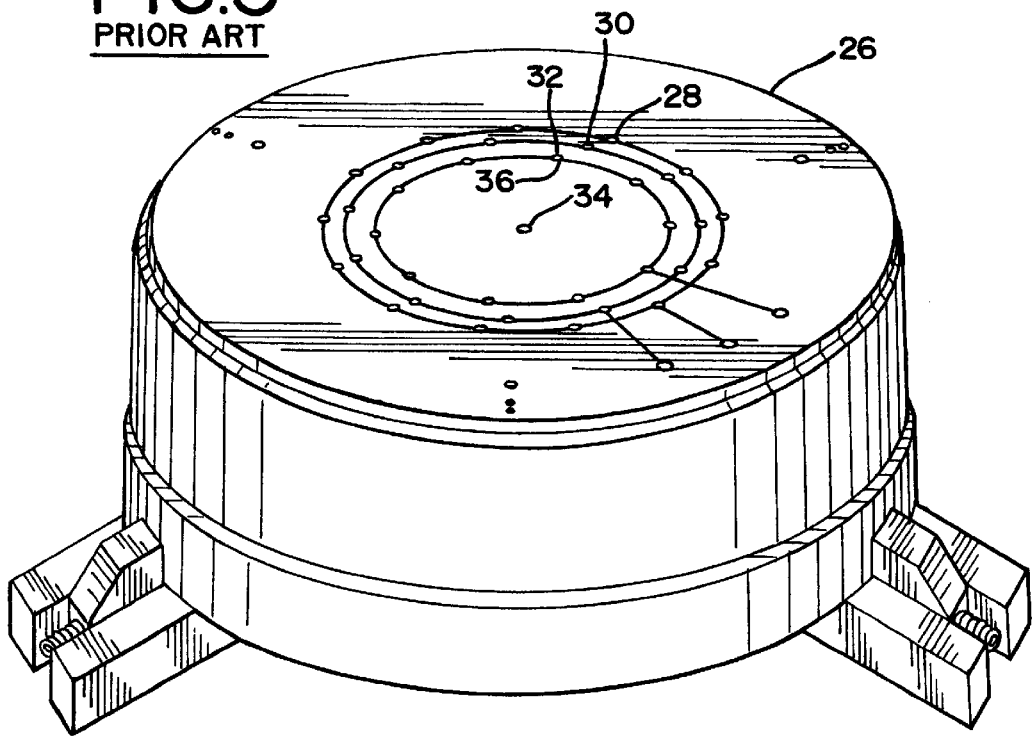
FIG. 3 is a perspective view of a prior art template for drilling locator openings in the cope section of the graphite mold.
Figure 4:
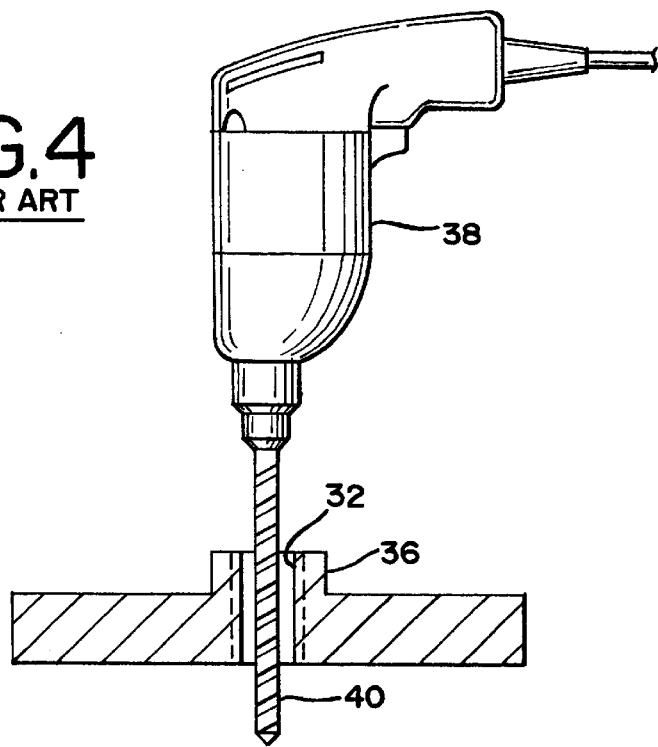
FIG. 4 is a side view in partial cross section of a prior art hand drill for drilling the locator openings in the cope section of the graphite mold.
Figure 5:
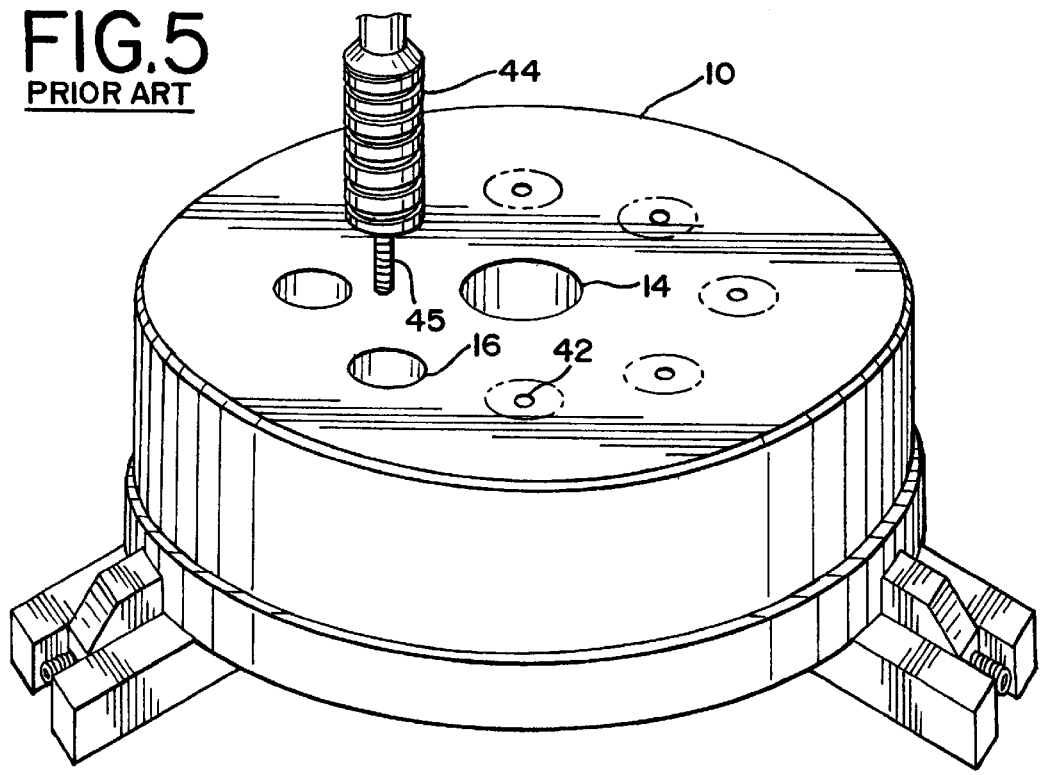
FIG. 5 is a side view of a prior art drill press utilizing the predrilled locator openings to drill riser openings in the cope section of the graphite mold.
Figure 6:
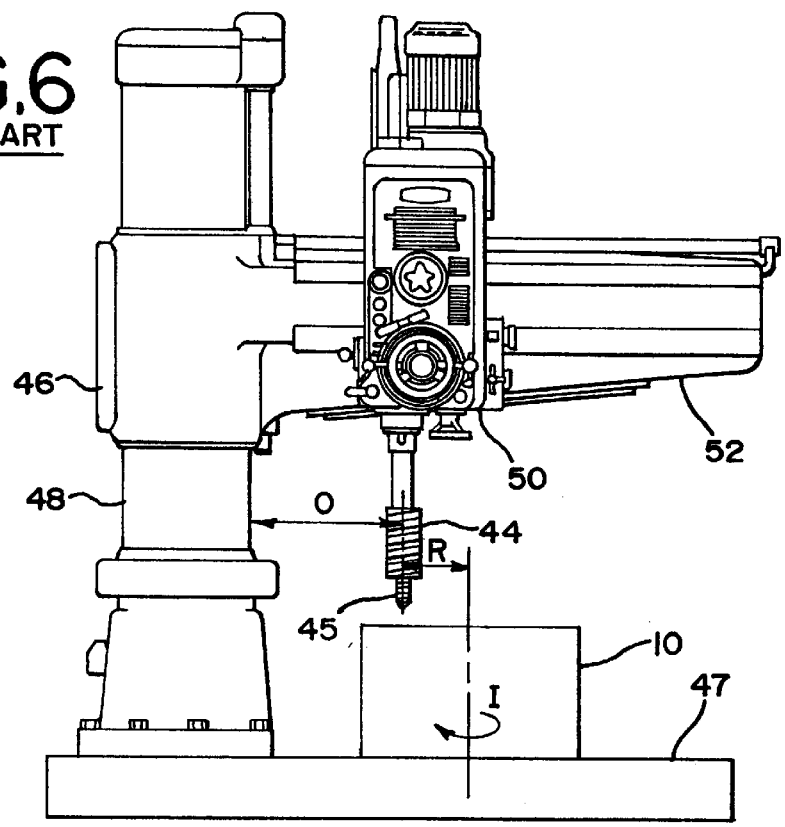
FIG. 6 is a side view of a prior art drill press and graphite mold.
Figure 7:
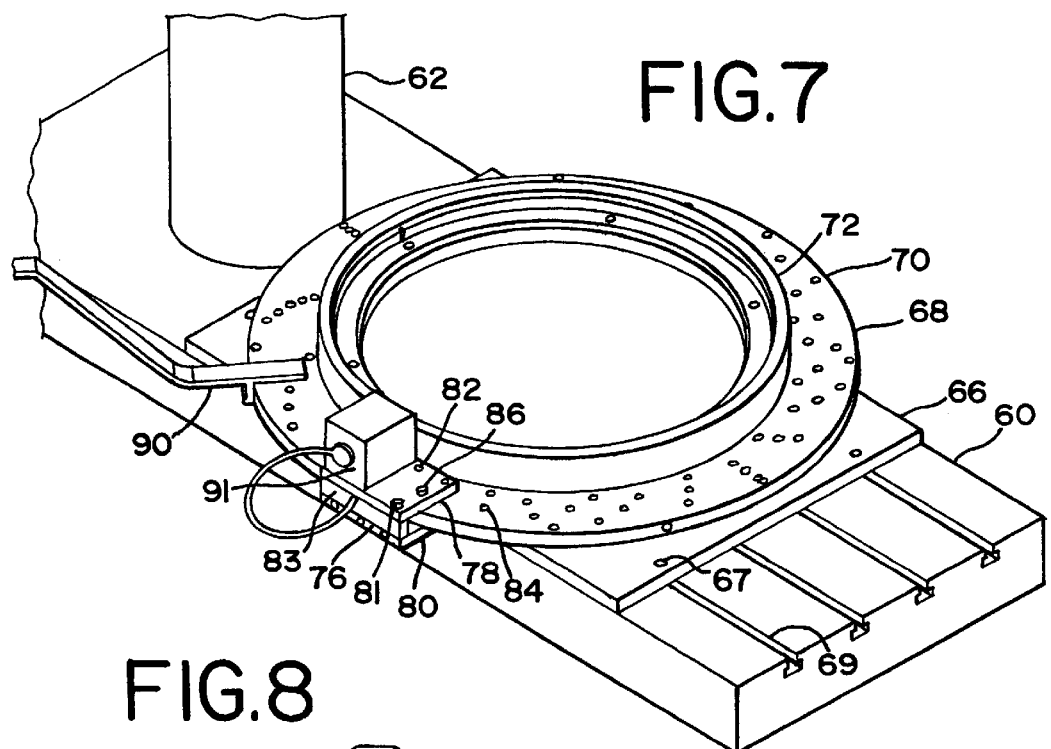
FIG. 7 is a perspective view of the indexing plate, indexing plate support and drill press table support in accordance with the present invention.
Figure 8:
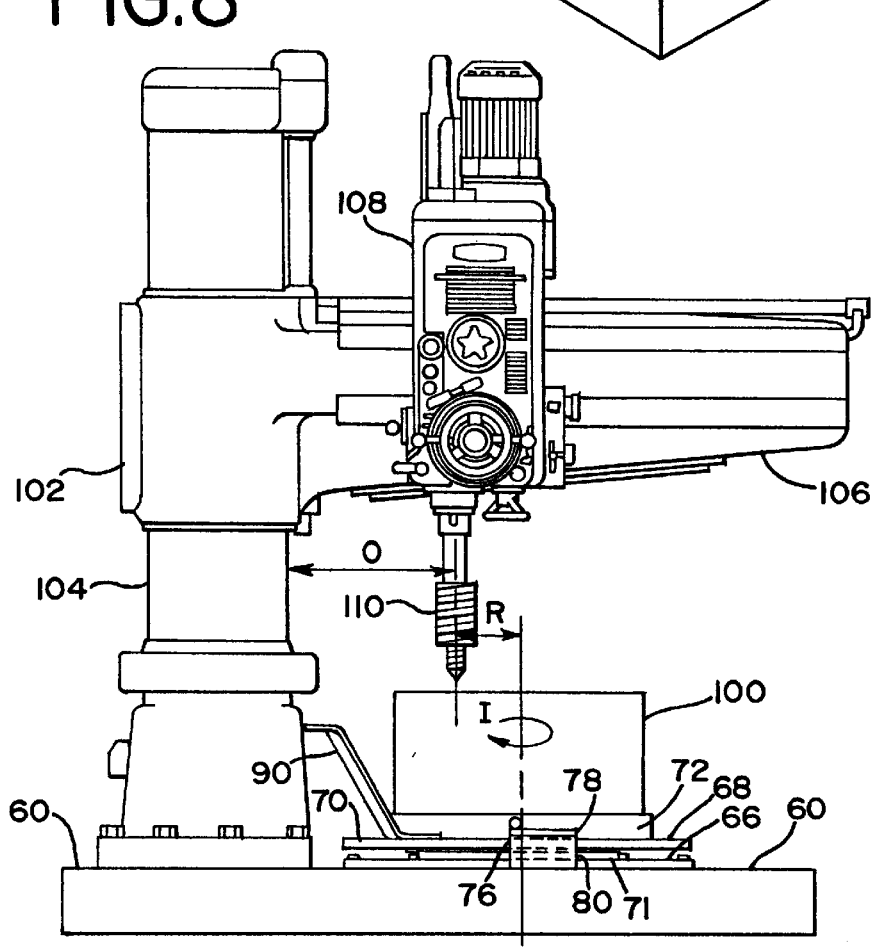
FIG. 8 is a side view of a drill press, indexing plate, indexing plate support and graphite mold cope section in accordance with the present invention.
Figure 9:
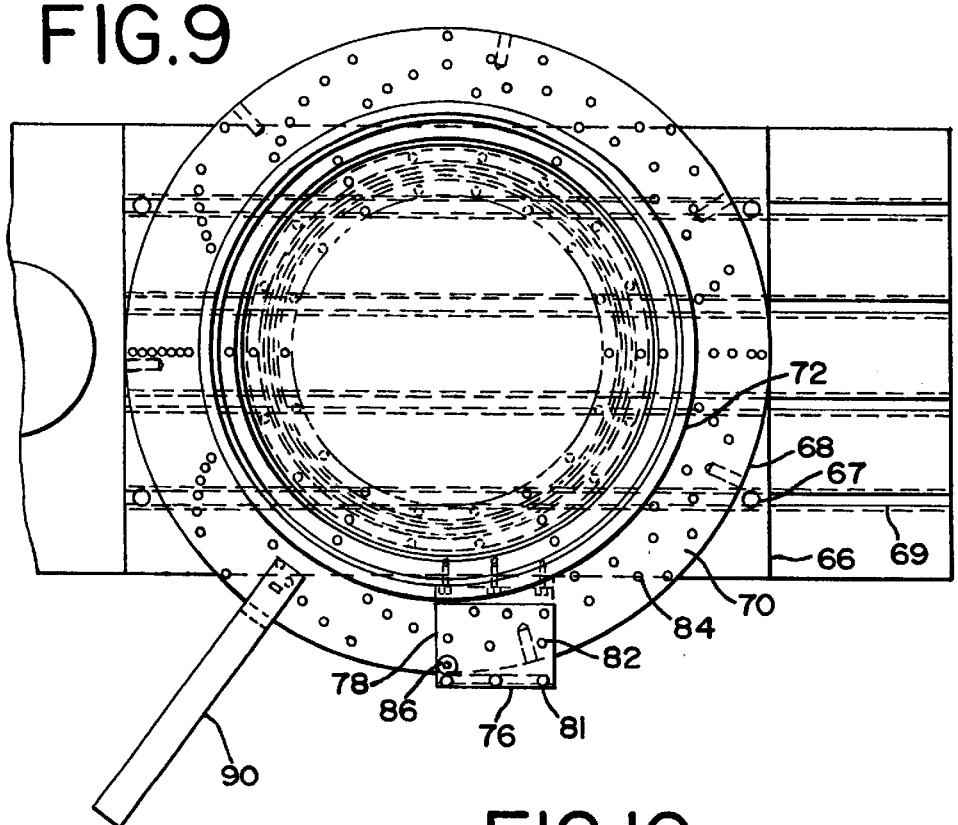
FIG. 9 is a top view of the indexing plate, indexing plate support, and drill press table in accordance with the present invention.
Figure 10:
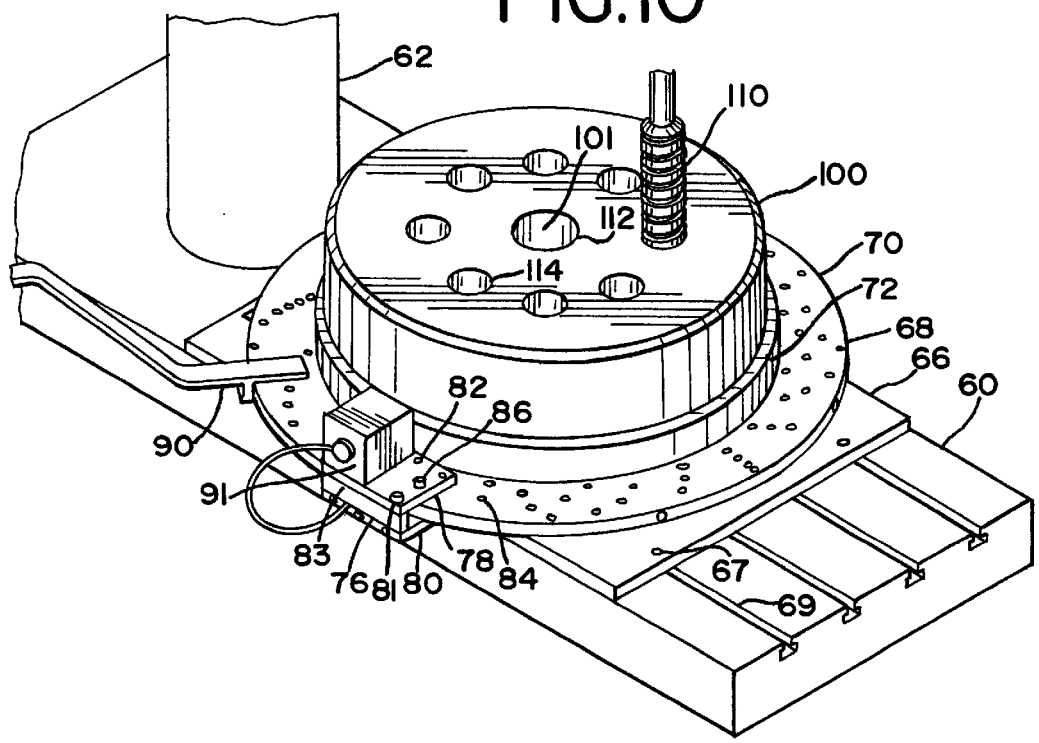
FIG. 10 is a perspective view of the drill press, cope section of the graphite mold and tool for drilling riser openings in accordance with the present invention.

Referring now to FIGS. 7–10 of the drawings, a drill press table 60 is shown as a generally rectangular elongated structure from which cylindrical drill press support 62 extends upwardly. Indexing plate base 66 is seen to be a generally rectangular structure, usually comprised of steel, and held to work drill press table 60 by bolts 67 that extend inwardly into slots 69 on the top surface of drill press table 60. Indexing plate 68 is shown to be a generally circular structure comprising indexing plate extended edge section 70 with a circular block support structure 72 extending upwardly from an inner portion of indexing plate extended edge 70. Bearing structure 71 is seen to be interposed between indexing plate 68 and indexing plate base 66. Bearing structure 71 includes roller bearings, ball bearings or other roller structures to allow indexing plate 68 to rotate around its center axis on indexing plate base 66.

Indexing plate support 76 is seen to be comprised of generally rectangular top section 78 and generally rectangular bottom section 80, both assembled together by bolts 81 extending through side section 83. Top section 78 is seen to be spaced vertically from bottom section 80 in order to allow indexing plate extended edge section 70 to extend between top section 78 and bottom section 80.

Indexing plate extended edge section 70 is seen to include a plurality of indexing plate guide openings 84. Indexing plate guide openings 84 are machined into the metallic structure, usually steel of about 1½ inches thickness, of indexing plate extended edge section 70. The location of indexing plate guide openings 84 is engineered to correspondence with the desired rotation or indexing of indexing plate 68 through indexing plate support 76.

Indexing plate support top section 78 is seen to include of a plurality of indexing plate support openings 82. Locator pin 86 is seen to extend through an indexing plate support opening 82 and into an indexing plate guide opening 84 on indexing plate extended edge section 70. Indexing plate handle 90 is seen to aid in the rotation of the indexing plate 68 through indexing plate support 76. Further, more than one locator pin 86 could be used if it is desired that more than one opening could be aligned between indexing plate support top section 78 and indexing plate extended edge 70.

Drill press 102 is seen to comprise to drill press support 104, usually a cylindrical steel structure extending upwardly from drill press table 60. Drill press radial arm 106 is affixed about drill press support 104 and extends radially outwardly therefrom. Drill press spindle 108 comprise a motor structure to drive drill press tool 110, which extends downwardly from drill press spindle 108. Graphite block 100 is seen to be received in block support 72 of indexing plate 68. Depending on the size of graphite block or cope section 100, different size indexing plates and block supports 72 can be used.

Drill press radial arm 106 is located at a transverse angle directly across a diameter of cope 100. This enables drill press spindle 108 and drill press tool 110 to be located at a minimum distance radially from drill press support 104 over the initial riser opening 114 to be drilled in cope 100. Without any prelocating holes, drill press tool 110 lowers and drills a riser opening 114. Drill press spindle 108 is then raised and locator pin 86 is pulled from its position in indexing plate support opening 82 and indexing plate guide opening 84. Handle 90 or motor mechanism 91 is used to rotate indexing plate 68 and cope 100 the preselected angular displacement to align the next riser opening location with drill press tool 110. Note that neither drill press radial arm 106 nor drill press spindle 108 has moved. Also, note that drill press spindle 108 remains located at the minimum radial distance from drill press support 104. Locator pin 106 is once again placed into the preselected aligned indexing support opening 82 and indexing plate guide opening 84. Drill press tool 110 is then lowered and the second riser opening 114 is drilled into cope 100. This process is repeated until a plurality of riser openings is drilled at the same radius outwardly from center point 101 of cope 100 without the need to reposition drill press radial arm 106 or drill press spindle 108.

What is claimed is:

1. A method of boring a plurality of openings in a block comprising the steps of:

securing an indexing plate to a base of a drill press such that the indexing plate is rotatably moveable on the drill press base about a preselected axis, securing an extended edge of the indexing plate with an indexing plate support, placing the block in the indexing plate such that the block rotates with the indexing plate, drilling a first opening in the block at a first preselected location, rotating the indexing plate with the block and drilling a second opening in the block at a second preselected location, wherein the first and second openings are at the same radial distance from a center point of the block, wherein the indexing plate is circular in shape, with a plurality of guide openings in the extended edge portion, wherein the indexing plate support has a plurality of support openings, and wherein a locating pin passes through a support opening in the indexing plate support into an aligned guide opening in the extended edge portion of the indexing plate to hold the indexing plate at a preselected location on the drill press base, and wherein selected support openings in the indexing plate can be aligned with selected guide openings in the indexing plate to allow a preselected number of equally spaced apart openings to be drilled in the block at a preselected radial distance from the center point of the block.

2. A method of boring a plurality of openings in a cylindrical block comprising the steps of:

securing an indexing plate assembly to the base of a drill press such that a circular indexing plate is rotatably removable on the drill press base about a preselected axis, securing an extended edge of the indexing plate from rotation with an indexing plate support, placing a cylindrical block onto the indexing plate such that the block rotates with the indexing plate, drilling a first opening through the cylindrical block at a preselected angle and radial distance from a center axis of the cylindrical block, rotating the indexing plate with the cylindrical block through a preselected angular displacement and drilling a second opening through the block at a preselected angular displacement from the first opening and at the same radial distance from the center axis of the cylindrical block as the first opening, wherein the extended edge of the indexing plate is circular in shape with a plurality of guide openings therein, the indexing plate support has at least one support opening, and the indexing plate is secured from rotation by a removable locating pin passing through a support opening in the indexing plate support and an aligned guide opening in the indexing plate, and the indexing plate support engages at least a portion of the extended edge of the indexing plate and the indexing plate support includes an advancing mechanism whereby the indexing plate can be rotated a selected angular displacement through the indexing plate support.

3. The method of claim 1 comprising the step of providing a drill press with a drill spindle moveable along a radial arm extending from a drill press support, securing the indexing plate at a preselected distance from the drill press support such that the drill spindle is extended a minimum distance along the radial arm from the drill press support in order to drill the openings in the block at the preselected radial distance from the center point of the block.

4. The method of claim 2 further including the steps of continuing to rotate the indexing plate with the cylindrical block through similar angular displacements and drilling additional openings through the cylindrical block until a plurality of equally spaced openings are present in the cylindrical block at the same radial distance from the center axis of the cylindrical block.

5. The method of claim 1 wherein the block is cylindrical in shape and wherein a plurality of equally spaced apart openings at a preselected radial distance from the center of the block are drilled in the block.

6. The method of claim 5 wherein the block is comprised of graphite and the openings comprise riser holes that extend completely through the block.

7. A drill press assembly comprising a drill press table, a base plate secured to the drill press table, an indexing plate rotatably moveable on the base plate about a preselected axis, an indexing plate support securing an extended edge of the indexing plate, a block placed in the indexing plate such that the block rotates with the indexing plate, a drill press arm on a drill head supported thereon, the drill head located at a preselected location on the drill press arm in order to drill a first opening in the block at a first preselected location in the block, and, upon rotation of the indexing plate and the block, the drill head being able to drill a second opening in the block at a second preselected location without moving the drill head, and wherein the first and second openings in the block are at the same radial distance from the center point of the block, wherein the indexing plate is circular in shape with a plurality of guide openings in an extended edge portion of the guide plate, the indexing plate support has a plurality of support openings, and a locating pin passes through a support opening in the indexing plate support into an aligned guide opening in the indexing plate to hold the indexing plate at a preselected location on the drill press table, and wherein that selected support openings in the indexing plate can be aligned with selected guide openings in the indexing plate to allow a preselected number of equally spaced apart openings to be drilled in the block at a preselected radial distance from the center point of the block.

8. The method of claim 2 comprising the step of providing a drill press with a drill spindle moveable along a radial arm extending from a drill press support, securing the indexing plate at a preselected distance from the drill press support such that the drill spindle is extended a minimum distance along the radial arm from the drill press support in order to drill the openings in the cylindrical block at the preselected radial distance from the center axis of the block.

9. The drill press assembly of claim 7 wherein the drill press includes a drill spindle moveable along a radial arm extending from a drill press support, the indexing plate is secured at a preselected distance from the drill press support such that the drill spindle is extended a minimum distance along the radial arm from the drill press support in order to drill the openings in the block at the preselected radial distance from the center point of the block.

10. The method of claim 4 wherein the plurality of equally spaced openings are drilled through the cylindrical block without moving the drill spindle.

11. The drill press assembly of claim 7 wherein the block is cylindrical in shape and wherein a plurality of equally spaced apart openings at a preselected radial distance from the center of the block are drilled in the block.

12. The drill press assembly of claim 7 wherein the block is comprised of graphite and the openings comprise riser holes that extend completely through the block.

* * * * *